June 21, 1938.　　S. A. WISDOM　　2,121,463
MAKING CARBON BLACK
Filed Dec. 14, 1931　　2 Sheets-Sheet 2

Inventor
Stuart A. Wisdom
By
Attorney.

Patented June 21, 1938

2,121,463

UNITED STATES PATENT OFFICE 2,121,463

MAKING CARBON BLACK

Stuart A. Wisdom, Shawinigan Falls, Quebec, Canada, assignor to Canadian Electro Products Company, Limited, Montreal, Quebec, Canada Application December 14, 1931, Serial No. 581,039
In Canada August 13, 1923

8 Claims. (Cl. 134—60)

This invention relates to a continuous process for the manufacture of carbon black by thermal dissociation or cracking of acetylene or other gas or gas mixture capable of being cracked to yield amorphous carbon and hydrogen (the term "gas" being herein used as including vapours, such as those of certain hydrocarbon oils, which may be cracked as aforesaid).

The primary object of the invention is to produce carbon black having a very low content of ash or gritty matter and of oily or soluble matter. A further object is to obtain a high yield of carbon black. A still further object is to avoid the occurrence of polymerization or of side reactions in such close proximity to the point of inlet of the gas into the cracking apparatus that the solid products resultant of polymerization or of side reactions will accumulate at and obstruct the gas inlet. Another object is to remove oily matter from the black by passing black through a flame, preferably that formed by burning the hydrogen effluent from the process. Still another object is to provide a process which may be conducted with great ease and safety by burning the effluent hydrogen in such wise as to prevent the entrance of air to the reaction zone while at the same time affording a means of cleansing the black without impeding its escape by gravity from the cracking apparatus. Various other objects and the advantages of the invention may be ascertained from the following description and the accompanying drawings.

It will be understood the present invention relates to production of carbon black from any gas or gas mixture capable of being continuously thermally dissociated or cracked in the manner herein described to yield amorphous carbon and hydrogen and that in consequence, while the invention is particularly advantageous for production of carbon black from acetylene, which is so highly endothermic that it releases on dissociation sufficient heat for continuance of the process, the invention is not limited to production of carbon black from acetylene but extends to use of other gases or gas mixtures as aforesaid even though it may be necessary to resort to partial combustion of the gas or gas mixture to maintain reaction temperature and continuous operation.

In the following description and in the claims the term "dissociable gas" is to be understood as a generic term including all gases or gas mixtures (including vapours) which are capable of being continuously cracked as described to yield carbon and hydrogen.

According to this invention, a stream of the dissociable gas, at a temperature materially below that at which any undesirable reaction will occur, and an enveloping concurrent stream of another suitably cool gas (hereinafter called "insulating gas") are liberated in suitable cracking apparatus wherein the dissociable gas is heated to at least its dissociation temperature and is thereby cracked to yield amorphous carbon and hydrogen. For a short distance inwardly from the gas inlet, the enveloping stream of insulating gas persists around the stream of dissociable gas, as essentially stream line or non-turbulent flow of the streams prevails, and so thermally insulates the latter that that portion of the stream adjacent the inlet does not become heated to a temperature at which the molecular structure of the gas is altered with yield of products that would deposit and accumulate around the inlet. The formation of polymerization or reaction products which would deposit at the gas inlet, if there is any such formation, occurs at a point so remote from the gas inlet that the products cannot deposit but are swept along in the gas stream. The dissociable gas and the insulating gas are supplied preferably in vertically downward direction, under pressure slightly above atmospheric, the pressure of the insulating gas being preferably slightly less than the pressure of the dissociable gas, so as to produce a quiet, or essentially stream line, slowly descending stream. Under proper conditions the dissociable gas dissociates so quietly that the carbon appears in flocculent masses. The outlet of the apparatus is preferably vertically beneath the gas inlet and communicates directly with the atmosphere, so that the carbon is continuously withdrawn by gravitation and by entrainment in the escaping hydrogen. The hydrogen is burned with air at the outlet and the flame forms a seal preventing entrance of air through the exit. Oily matter in the carbon is burned out or otherwise removed during passage of the carbon through the flame.

The reaction temperature is maintained by heat liberated by dissociation or by partial combustion of gas or by a combination of the two, so that the process is continuous.

The enveloping stream of gas which serves to thermally insulate the stream of dissociable gas may be any suitable gas such as air, carbon dioxide, nitrogen or any other gas or vapour which will have the desired insulating effect and which will not be undesirably affected by the high temperatures or produce undesirable products in the reaction either of itself or by reaction with the dissociable gas or its dissociation products. The insulating gas preferably used is air and the amount thereof normally required for insulating purposes is so little that only a very small proportion of the dissociable gas will be oxidized. In the case of dissociating acetylene, the amount of air necessary for insulating purposes need not be more than will oxidize from 1/10 of one percent to 1% of the acetylene, but a larger percentage may be used at the expense of a reduced yield of carbon black. In the dissociation of other dissociable gases, similarly small proportions of air will suffice for insulating purposes, but where the gas or gas mixture is so slightly endothermic that the heat released on dissociation will not maintain the temperature of reaction, or where the gas is exothermic, the amount of air or other oxidizing gas may be increased beyond that necessary to constitute the insulating stream so as to provide, by partial combustion of the dissociable gas, the additional heat necessary to maintain the reaction. It will be understood, however, that even when some oxidation is necessary to maintain the reaction temperature the insulating gas need not be of oxidizing character.

The accompanying drawings illustrate one form of apparatus suitable for carrying out the process, but it will be understood that the process is in no way limited to the use of the depicted apparatus.

In the drawings:—

Fig. 3 is a vertical sectional view of the "burner" on a larger scale than Figure 1.

Figure 1:
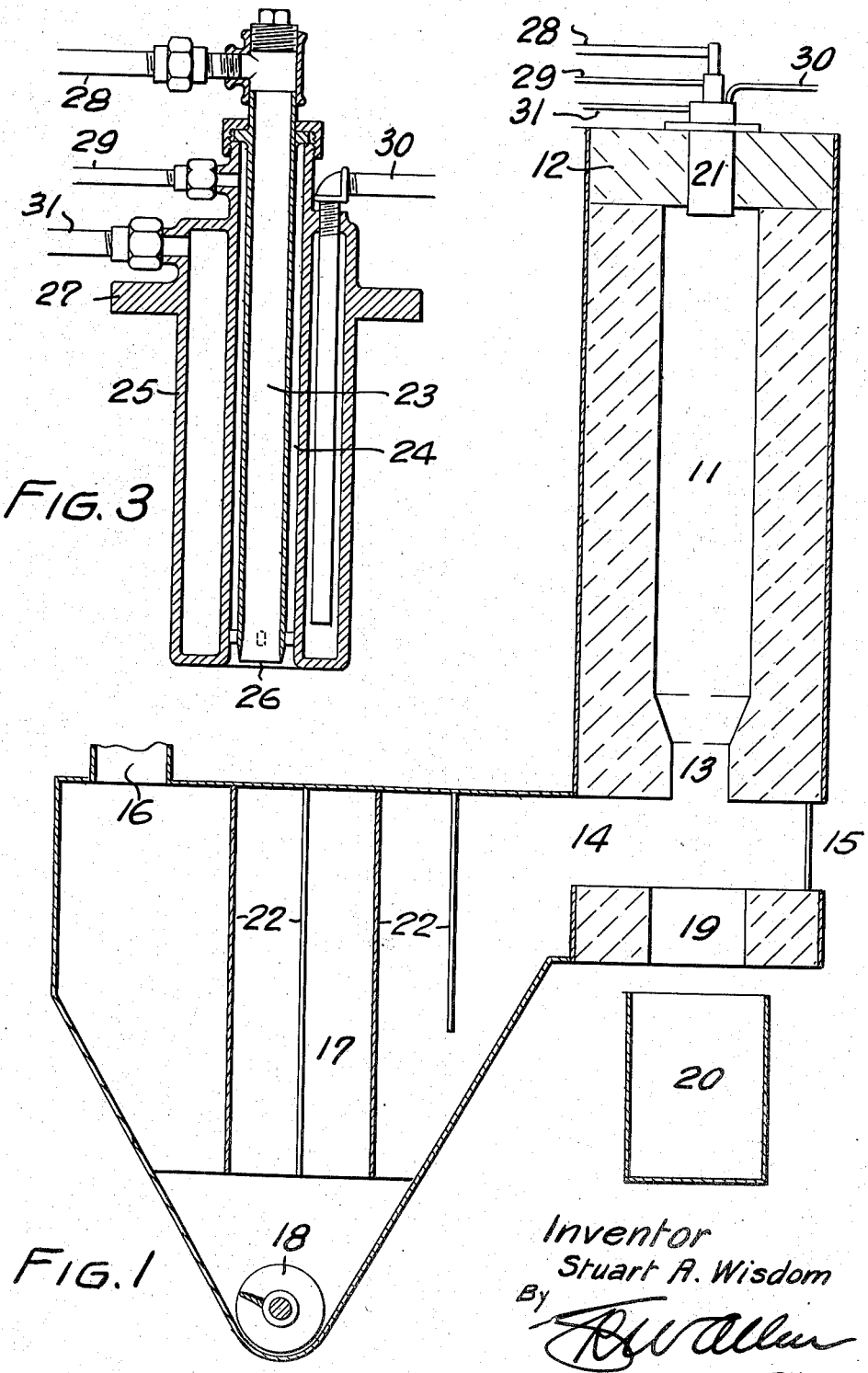
Fig. 1 is a vertical sectional view of the apparatus.
Figure 2:
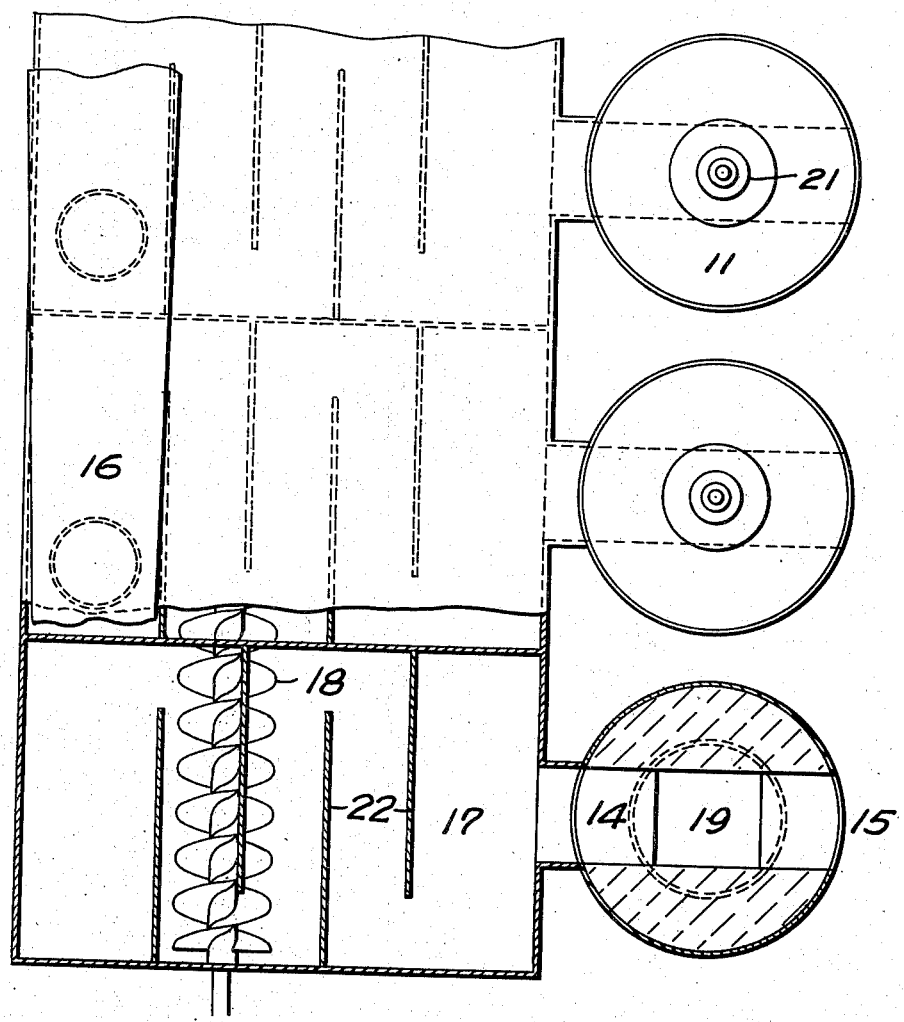
Fig. 2 is a plan view.

Referring more particularly to the drawings, 11 designates a retort having a lining preferably of fire brick or other suitable refractory. This retort is preferably cylindrical, of dimensions suitable to the volume and velocity of the gas stream to be dealt with. The retort is vertically disposed and closed at its upper end by a removable top 12 which preferably retains position merely by action of gravity, a grouting being used to make the joint air tight. The lower end of the retort is open but is preferably reduced slightly in diameter, as at 13, to concentrate escaping hydrogen and minimize possibility of air entering. Preferably, a series of these retorts are arranged in rows or batteries.

A large flue 14 extends from front to back of each retort and in communication with the open bottom thereof. These flues 14 are preferably open at the front 15 for entrance of air and for observation and communicate at their rear ends through collecting means with an upwardly extending stack 16. The collecting means may be a series of chambers 17, one for each retort and uniting at the bottom to form a trough extending the length of the battery, below the flues, and containing a screw conveyor 18 or other suitable apparatus for removing the carbon black. Directly beneath the lower end of each retort an opening 19 is provided in the lower wall of the flue and any suitable sort of receptacle 20 is placed thereunder to collect carbon and gritty product which may fall through the opening. One or more baffles 22 are preferably placed in each collecting chamber between the flue and stack to separate the carbon black from the products of combustion and cause the carbon black to fall into the trough 17. Instead of the collecting chambers a bag filter apparatus may be used.

At the upper end of the retort a burner, designated 21 in Figure 1, is supported by the cover 5 12 in preferably axial alignment with the retort, the cover being apertured for passage of the burner and an air-tight joint preferably made. Thus the walls of the cylindrical chamber 11 are substantially parallel to the surfaces of the gas and air that flow from the burner. This burner, shown in detail in Figure 3, comprises a central and readily removed tube or passage 23 for the dissociable gas, a concentric enveloping tube 24 to provide an annular passage for insulating gas, and a cooling jacket 25 surrounding the tube 24. The lower ends of the tubes 23 and 24 and of the jacket 25 preferably terminate at about the same level but this may be departed from, for example by terminating the tube 23 slightly above the end of the tube 24, as illustrated. The lower end of the tube 23 is preferably sharpened externally or internally or both to a knife-edge 26 which brings the edges to within less than substantially 1/8 inch of each other, to present the minimum of end surface for adherence of liquid or solid matter. The lower portions of the tubes 23 and 24 may be cylindrically or otherwise formed as desired and maintained in concentric relation by spaced lugs or other suitable means. The burner is supported from the cover by a flange 27 or other suitable means. Valved supply pipes 28 and 29 lead to the tubes 23 and 24 respectively and a supply pipe 30 for cooling agent, preferably water, leads to a point near the bottom of the jacket, while a discharge pipe 31 for cooling agent leads from the top of the jacket.

To start the apparatus in operation (using air as an insulating gas), the retort is heated to a dull red heat, or any higher temperature that may be necessary, preferably by admitting dissociable gas and air to the burner in proper proportions for complete combustion and igniting the mixture so that the burner serves as a torch, but a special torch or other means may be used. When the proper heat is attained, the air is cut off or the supply diminished and the dissociable gas supply suitably regulated. Dissociation commences and large flakes of flocculent amorphous carbon immediately appear falling from the open bottom of the retort. The continuous input of gas serves to expel the produced hydrogen through the outlet 13. If the effluent hydrogen does not ignite of itself on meeting air it is immediately ignited at the bottom of the retort and burns quietly. The flame of burning hydrogen forms a seal at the bottom of the retort to exclude air which might form explosive mixtures with hydrogen or with uncracked dissociable gas in the retort. The fact that the hydrogen is burned precludes possibility of it forming explosive mixtures with air in the collecting chambers or elsewhere. The draft of the stack draws the flame rearwardly while the open front of the conduit admits air and prevents the draft evacuating gas in the retort and also enables inspection to ascertain that the retort is working efficiently and that hydrogen is burning. This rearwardly moving flame carries the larger part of the black with it into the collecting chamber so that the black falls into the trough. The baffles 22 serve to facilitate this separation of solid and gas. The large masses of black, which are too heavy for the light draft to carry, also any grit from the retort wall or any coke-like matter, fall into the receptacle 20. Admission of air may be regulated in any suitable way, as by returning a part of the stack gases to the front ends of the flues.

All the escaping carbon black passes through the hydrogen flame with the result that oily or other combustible compounds are wholly or largely burned out. At most, only small loss of black results from this owing to the fact that the temperature is usually below that required for combustion of elemental carbon in air.

The following examples are further explanatory of the process but it will be understood the process is not confined to the dissociable gases nor to the insulating gases nor to the particular combinations thereof mentioned, but extends to other dissociable gases and other insulating gases and other combinations of the gases specifically mentioned.

*Example I*

Proceeding as already described, acetylene gas is discharged into the retort at a pressure slightly above atmospheric and air at slightly lower super-atmospheric pressure is used as an insulating gas, the amount of air being that which will oxidize between one-tenth of one percent and one percent of the acetylene. The acetylene and air are preferably precooled to somewhat below ordinary atmospheric temperature. The results obtained are as previously described.

*Example II*

The process is carried out as in Example I, except that carbon dioxide or nitrogen is used as an insulating gas in place of air, the rate of supply (in terms of volume unit per time unit) being approximately the same as for the air.

*Example III*

The process is carried out as in Examples I or II substituting for acetylene, a mixture of acetylene and natural gas of high methane content in proportions of approximately one volume of acetylene to two volumes of natural gas. The acetylene supplies, on dissociation, the heat necessary for dissociation of the natural gas.

*Example IV*

The process is carried out as in Example III, substituting for the natural gas a hydrocarbon vapour, such as that produced by warming benzol or by atomizing or vaporizing a heavier liquid hydrocarbon; the precooling being necessarily omitted. Absence of precooling is not objectionable in this instance as the dilute acetylene apparently does not polymerize as readily as the undiluted acetylene.

*Example V*

The process is carried out as in either of Examples III or IV, with the exception the amount of acetylene is reduced to such extent that the heat liberated by its dissociation is not sufficient for dissociation of the admixed gas. The deficiency is made up by admitting a sufficient amount of an oxidizing gas so that the heat liberated by combustion of a part of the dissociable gas will supply the heat necessary for continuance of the dissociation.

At the top of the retort water or other cooling agent is flowing through the burner jacket and keeps the air or other insulating gas flowing through the pipe 24 cool and this in turn keeps the incoming dissociable gas below its dissociation temperature until it enters the retort. The air or other insulating gas entering in an envelope around the dissociable gas prevents or greatly minimizes the adherence of carbon to the end of the tube 26 by preventing the dissociable gas adjacent the inlet from being heated to polymerizing or to cracking temperature. When using acetylene, efficient cooling of the acetylene and of the insulating gas before their liberation in the retort is essential to avoid polymerization and coke formation, the gases being cooled preferably to below ordinary atmospheric temperature but when using dissociable gases less readily polymerizable than acetylene the temperature of the gases may be higher.

With proper regulation, dissociation of the dissociable gas takes place quietly, with production of carbon in large flocculent masses, presumably in the upper part of the retort. If the pressure and therefore the velocity of the dissociable gas is too great, the stream line or non-turbulent character of flow naturally is altered to turbulent flow and the gas apparently becomes diluted with hydrogen before dissociation, producing small particles of carbon black instead of large masses, which small particles are difficult to separate from the products of combustion. Also, polymerization and coke formation may result. Excess supply of dissociable gas or excessive velocity of the stream, imperfect dissociation or excessive burning of the product at the base are indicated by alteration in the appearance of the flame, which under perfect conditions should be the clear characteristic flame of hydrogen rendered slightly luminous by a few small particles of incandescent black therein and disclosing large masses of black carried along by it. Satisfactory results have been obtained using pressures only slightly above atmospheric but a considerable variation is possible for the pressures of both the dissociable gas and the insulating gas.

The process and apparatus are particularly safe to use. When starting a retort the heating flame burns or drives out all air in the retort and the dissociation can be started by merely reducing the air supply and without giving opportunity for air to enter at the bottom. By reason of the flame of burning hydrogen at the bottom of the retort, air is positively excluded therefrom and by reason of burning the hydrogen it is not necessary to have an air-tight collection chamber to avoid explosive air-hydrogen mixtures therein. If gas in a retort should explode for any reason, the explosion has free vent at the open bottom of the retort and through the flue opening 19, so that it does not blow into the collecting apparatus. If the explosion should be considerable, the top of the retort will lift and give further vent so that the walls of the retort will not be disrupted.

The process is for all practical purposes continuous. With a properly proportioned retort and proper regulation of the dissociable gas and insulating gas supply to prevent carbon growth on the burner, the process may go on indefinitely as the black does not cling to the hot brick lining and fill the retort. It is necessary, however, to inspect the burner if it is not functioning properly, as can be seen from below, to remove any carbon which may have accumulated.

The feature of insulating the dissociable gas against heating in close proximity to the inlet is of great importance to the maintenance of continuous and satisfactory operation. For example, when using an enveloping stream of air in conjunction with an enveloped stream of acetylene, it is found that the operation can continue for days or even weeks but that when the enveloping stream of air is discontinued, a hard coke-like mass builds up around the acetylene inlet and in a few minutes accumulates to such an extent that the inlet is seriously obstructed and the velocity of the acetylene stream thereby undesirably increased. The same freedom from obstruction at the acetylene inlet is experienced if other suitable gases are substituted for air in the enveloping stream and use of the enveloping stream in conjunction with dissociable gases other than acetylene will give similar freedom from undesirable deposits at the gas inlet. When the dissociable gas and insulating gas enter the retort at sufficiently low pressure and velocity, a considerable portion of the produced carbon black appears in large masses which are readily collected but, if the velocity of the gases is too high, the carbon black appears in very finely divided form in suspension in the hydrogen, resembling smoke, and is extremely difficult to separate from the hydrogen or its combustion products. Solid accumulations at the gas inlet which reduce the size of the inlet will obviously cause an increase in the velocity of the entering gas and in turn cause the carbon to appear in the aforesaid finely divided and difficultly recoverable form. From the foregoing, it will be seen that the quality and the ease and extent of recovery of the solid product depend to a large extent upon use of an envelope of insulating gas around the stream of dissociable gas adjacent the inlet. Furthermore, the insulating gas serves to maintain the input of dissociable gas such that the amount of produced hydrogen is sufficient to maintain a sealing flame of effective size at the bottom outlet. If the gas input is diminished, by carbon accumulation at the inlet, materially below the rated capacity of the retort, the hydrogen flame is not large enough to completely seal the bottom outlet and air enters and forms explosive mixtures with the hot hydrogen or with uncracked dissociable gas.

In addition to ensuring appearance of carbon in relatively large flocculent masses, the low pressure and low velocity of the gas input are important in that the black is not swept rapidly through the retort but is allowed to gravitate slowly to the bottom outlet so that the black remains exposed to heat for a considerable period of time, with the result most of the oily matter that may be formed is cracked in the retort and but little remains to be burned at the outlet. The process is operated at comparatively high temperature, for example approximately 1800° F. or over for cracking acetylene. The high temperature combined with the prolonged exposure of black thereto results in the production of carbon of unusually good quality—having the characteristics of amorphous graphite. The graphitic characteristics of black produced according to this process are higher ignition temperature, higher electric conductivity and higher heat conductivity than blacks produced from oil gas or natural gas by conventional processes. Also, the highly flocculent black produced according to this process has higher absorption capacity than blacks produced by ordinary processes. The foregoing qualities are especially characteristic of carbon black produced according to this invention from acetylene. Moreover, carbon black of graphitic character produced according to this invention, particularly acetylene black, is of different physical structure from blacks otherwise produced, as may be readily demonstrated by microscopic examination.

This application is a continuation in part of my former applications Serial Numbers 657,586 and 657,587, filed August 15th, 1923.

Having thus described my invention, what I claim is:—

1. A process of making carbon black by cracking dissociable hydrocarbon gas which comprises heating a downwardly moving stream of the gas to at least its dissociation temperature whereby the dissociable gas is dissociated to yield carbon black, and burning products such as hydrogen with air at a location subadjacent to that at which cracking occurs whereby the produced black will gravitate through the hydrogen flame and be thereby cleansed.

2. A method of making carbon black which comprises passing a stream of dissociable hydrocarbon gas into the top of a chamber opening at its bottom directly to the atmosphere, for the escape of black by gravitation, heating said chamber to at least the dissociation temperature of the gas whereby the gas is dissociated to yield carbon black, preventing deposit of solid carbonaceous matter at the gas inlet by passing a stream of another gas into the chamber, said second stream enveloping the dissociable gas stream near the inlet and insulating the dissociable gas stream adjacent the inlet from the heat of the chamber whereby the dissociable gas stream is maintained for a short distance inwardly of the inlet at temperature below that at which it will form products capable of accumulating as solid carbonaceous matter at the inlet, and preventing entrance of air into said chamber through the bottom outlet thereof by burning products such as hydrogen at said outlet and in the path of black gravitating through the outlet whereby oily matter is burned out of the black, the efflux of hydrogen and consequent size of the flame being maintained adequately for sealing the outlet through maintenance of undiminished gas input by reason of preventing carbon accumulations at the gas inlet.

3. A dissociation process to produce carbon black comprising releasing a confined stream of acetylene at about atmospheric pressure into an unobstructed zone of sufficient temperature to dissociate the acetylene into carbon and hydrogenous gas, withdrawing the products of dissociation with sufficient rapidity to avoid dilution therewith of the acetylene before dissociation, the hot products being discharged into air for combustion of the hydrogenous gas, the heated carbon passing through a flame of the burning hydrogenous gas to cleanse the carbon.

4. A dissociation process to produce carbon black comprising releasing a low pressure stream of acetylene at about atmospheric temperature downwardly into an unobstructed zone at sufficient temperature to dissociate the acetylene to carbon and hydrogenous gas, withdrawing the hot products of dissociation downwardly with sufficient rapidity to avoid dilution therewith of the acetylene before dissociation, introducing the products while hot into air to burn the hydrogenous gas, and removing the carbon from the burning gas.

5. A dissociation process to produce carbon black comprising releasing a stream of acetylene at about atmospheric pressure and temperature into an unobstructed zone at sufficient temperature to dissociate the acetylene to yield carbon and hydrogenous gas, withdrawing the hot products with sufficient rapidity to avoid dilution therewith of the acetylene before dissociation, drawing the hot products into a stream of air, burning the hydrogenous gas therein, and drawing carbon and the resulting gases away from the burning hydrogenous gas.

6. A dissociation process to produce carbon black, comprising releasing a stream of acetylene at about atmospheric temperature and pressure downwardly into an unobstructed zone of sufficient temperature to dissociate the gas into carbon and hydrogenous gas, withdrawing the hot products downwardly into a stream of air to burn the gas, the products being withdrawn with sufficient rapidity to burn the gas in a clear flame characteristic of hydrogen, and drawing carbon and the resulting gases away from the flame.

7. Apparatus for production of carbon black comprising a cylindrical retort, concentric tubular inlets for gas opening near one end of the retort, an outlet at the other end, a flue extending across the outlet and connected therewith, the flue being open to the atmosphere adjacent the outlet, and a stack connected to the other end of the flue, carbon collecting means being interposed between the flue and the stack.

8. Apparatus for production of carbon black comprising a cylindrical retort, concentric inlet tubes for gas terminating at substantially a common level near one end of the retort, the common wall between the tubes sloping to a knife-edge, and an outlet at the other end of the retort communicating with a flue, said flue being open to the atmosphere adjacent the outlet.

STUART A. WISDOM.